US008332057B2

(12) United States Patent
Dubay et al.

(10) Patent No.: US 8,332,057 B2
(45) Date of Patent: Dec. 11, 2012

(54) METHOD OF MULTI-DIMENSIONAL NONLINEAR CONTROL

(75) Inventors: Rickey Dubay, Fredericton (CA); Jose Mauricio Hernandez, Hanwell (CA); Ma'moun Abu-Ayyad, Middletown, PA (US)

(73) Assignee: University of New Brunswick, Fredericton, New Brunswick ( * ) Notice: Subject to any disclaimer, the term of this patent is extended or adjusted under 35 U.S.C. 154(b) by 447 days.

(21) Appl. No.: 12/408,665

(22) Filed: Mar. 20, 2009

(65) Prior Publication Data

US 2009/0265021 A1 Oct. 22, 2009

Related U.S. Application Data

(60) Provisional application No. 61/038,275, filed on Mar. 20, 2008.

(51) Int. Cl.
*G05B 13/02* (2006.01)
(52) U.S. Cl. .................. 700/33; 700/29; 700/32; 700/42
(58) Field of Classification Search .................... 700/33, 700/29, 32, 42
See application file for complete search history.

(56) References Cited

U.S. PATENT DOCUMENTS

| | | | |
|---|---|---|---|
| 4,674,029 A | 6/1987 | Maudal | |
| 5,182,716 A | 1/1993 | Stroud, III et al. | |
| 5,351,184 A | 9/1994 | Lu et al. | |
| 5,394,322 A * | 2/1995 | Hansen | 700/37 |
| 5,442,544 A | 8/1995 | Jelinek | |
| 5,566,065 A | 10/1996 | Hansen et al. | |
| 6,167,360 A | 12/2000 | Erickson et al. | |
| 6,373,033 B1 | 4/2002 | de Waard et al. | |
| 6,714,899 B2 | 3/2004 | Kassmann | |
| 6,735,483 B2 | 5/2004 | Martin et al. | |
| 6,745,088 B2 | 6/2004 | Gagne | |
| 6,826,521 B1 | 11/2004 | Hess et al. | |
| 7,050,866 B2 | 5/2006 | Martin et al. | |
| 7,187,989 B2 | 3/2007 | Attarwala | |
| 7,203,554 B2 | 4/2007 | Fuller | |
| 7,203,555 B2 | 4/2007 | Ogunnaike et al. | |
| 2003/0018400 A1 * | 1/2003 | Tuttle et al. | 700/29 |
| 2005/0193739 A1 | 9/2005 | Brunell et al. | |
| 2005/0209714 A1 | 9/2005 | Rawlings et al. | |
| 2006/0241786 A1 | 10/2006 | Boe et al. | |
| 2007/0050053 A1 | 3/2007 | Cutler | |
| 2007/0078529 A1 | 4/2007 | Thiele et al. | |

OTHER PUBLICATIONS

Process Dynamics and Control, B. Roffel and B. Betlem, Wiley, 2006.
Response Surface Methodology, R. Myers and D. Montgomery, Wiley, 2002.

(Continued)

*Primary Examiner* — Tejal Gami
(74) *Attorney, Agent, or Firm* — Eugene F. Derényi; Fogler, Rubinoff LLP

(57) ABSTRACT

A computer implemented method of conducting closed-loop control of a physical system comprising the steps of carrying out an initialization of the physical system to commencing closed-loop control, evaluating the optimal constrained control move using the system error and the initial normalized matrix using a control move solver; calculating a first control action by the sum of delta u(0) and the initial control action; and implementing the result to the physical system by converting the control action to an output control signal to effect a change in at least one operating variable.

10 Claims, 3 Drawing Sheets

OTHER PUBLICATIONS

Deshpande, P. B. and Raymond H. A., Computer Process Control with Advanced Control Applications. 2nd Edition, ISA 1988.

Dahlin, E. B., Designing and tuning digital controllers. Instruments and Control Systems, 41, 77-83, 1968.

Dumont, G. A., Analysis of the design and sensitivity of the Dahlin regulator. Internal report, Pulp and Paper Research Institute of Canada, 1982.

Cutler, C. R., and Ramaker, D. L., Dynamic matrix control—a computer control algorithm. Proc. JACC; San Francisco, CA, 1980.

Shridhar, R., and Cooper, D. J., A tuning strategy for unconstrained SISO model predictive control. Industrial & Engineering Chemistry Research. 36, 729-746, 1997.

Gupta, Y. P., "Characteristic Equations and Robust Stability of a Simplified Predictive Control Algorithm", Canadian Journal of Chemical Engineering, 71, 1993, 617.

Abu-Ayyad, M., Dubay, R., and Kember, G. C., SISO Extended predictive control—formulation and the basic algorithm. ISA Transactions, 45, 9, 2006.

* cited by examiner

METHOD OF MULTI-DIMENSIONAL NONLINEAR CONTROL

CROSS-REFERENCE TO RELATED APPLICATIONS

This application claims the benefit of and priority from U.S. provisional application Ser. No. 61/038,275 filed Mar. 20, 2008.

FIELD OF THE INVENTION

The present application relates to multi-dimensional control algorithms for nonlinear behavior.

DESCRIPTION OF RELATED ART

In general, many processes in manufacturing applications, petrochemical industries, aerospace, robotics and others have nonlinear parameters. These parameters result in nonlinear dynamics that make the control of these processes very challenging. The degree of nonlinearity on these parameters can range from low to severe [1, 2] where nonlinear control is required for good control performance.

There are several control algorithms that have been used to control challenging systems with varying degrees of success. Some of these algorithms use conventional control schemes such as proportional, integral and derivative (PID) forms which perform well for a relatively low degree of nonlinearity. To overcome the problem of time-delays, an improved technique over PID, such as the Smith-Predictor that predicts future states of the controlled variable, can be used for control [3]. Dahlin [4] developed a controller that is a deadtime compensator where its tuning requires the model of the plant and a specified closed-loop time constant. Dumont [5] performed a sensitivity analysis of the Dahlin controller, demonstrating good robustness of the Dahlin controller when subject to modeling errors. These conventional control schemes are very limited in controlling systems that have a high degree of nonlinearity.

More advanced schemes have been derived which are model-based, employing techniques that involve fuzzy-logic, artificial neural networks, Gaussian model selection methods and others, all aimed at providing better control performance for higher degrees of plant nonlinearity.

One example of advanced controllers is termed model predictive control (MPC). The most common algorithm of MPC is known as dynamic matrix control (DMC) [6] and its strategy is based on a step response model of the controlled variable. Like any other algorithms, DMC has several drawbacks. The main drawback is the large number of parameters that can affect the tuning of the controller. The effect of these individual parameters on the controller performance is well known, but when several parameters are altered their overlapping effects make tuning a very complicated task [7] especially for nonlinear plants.

Another MPC algorithm, simplified predictive control (SPC), was proposed by Gupta [8] in which the error is minimized at one point on the prediction horizon and only one future control move is calculated. The drawback of SPC is that by restricting the control horizon to one ($n_u=1$) the closed-loop response can become unstable if the number of unstable modes in the process is greater than one. Another controller, the shifted DMC algorithm, restricts the control horizon to two ($n_u=2$) and demands very good understanding for its application to industrial plants.

The most recent development of a new MPC algorithm, termed extended predictive control (EPC) by Abu-Ayyad et al. [9], uses a unique weighting matrix to obtain the optimal range of the condition number of the system matrix. This method was effective for both SISO and MIMO plants and improved on the closed-loop results obtained by DMC, SPC and shifted DMC; however, these advanced predictive schemes may not work well for plants that are highly nonlinear.

These advanced controllers rely on a high level of complexity for their formulations and are therefore difficult to practically understand and implement. Furthermore, these advanced schemes are designed for handling specific nonlinearities and do not encompass wide ranging types. A major drawback on these advanced controllers is the inability to develop and use an accurate process model during control, which is a requirement for re-evaluating the controller parameters when the plant is highly nonlinear.

Based on the above prior art, there is a requirement to develop a method of enhancing the performance of current advanced controllers by having them react to the nonlinear characteristics of the plant or process that is being controlled.

Infinite Model Predictive Control Theory

Infinite model predictive control is an enhanced predictive control method that formulates a continuous nonlinear function of the plant or process in order to recalculate the plant system matrix and hence its control law. This continuous function is manipulated variable or control action dependent. At each sampling instant, the system matrix is re-evaluated from this continuous function, which is then used to determine the control move to the plant. This method gives improved control performance over other predictive control schemes and is termed the Infinite Model Predictive Control (IMPC) methodology.

In predictive control, the general algorithm uses a fixed model of the plant in order to determine a system matrix. In most cases, this matrix is time invariant or can be of a multi-model form that is reconstructed at setpoint changes.

The concept of the algorithm used in IMPC methodology is founded on the fact that the plant dynamic behavior is continuous during control. Therefore, an infinite set of system matrices can be evaluated from the continuous behavior of the plant in the limit as ($\Delta t \to 0$).

The development of the IMPC methodology is based on conducting m open-loop tests (both positive and negative changes in the manipulated variable) on the nonlinear process. From these tests, normalized response coefficients $a_k$ are extracted from the m open-loop tests vertically every $\Delta t$. Using these coefficients at each time step, analytical nonlinear expressions are derived as a function of the open-loop test signal $\tilde{u}_i$ as $$S_k(\tilde{u}) = \sum_{n=1}^{N} b_{kn}\tilde{u}^{h_n} \quad k = 1 \ldots P \tag{1}$$

In Eq. (1), N is the order of fitted polynomials, $b_{kn}$, are the polynomial coefficients and the exponentials $h_1, h_2, \ldots$ are real numbers. Therefore, any magnitude (within limits) of the manipulated variable can be injected into Eq. (1) in order to evaluate normalized response coefficients over the prediction horizon k=1, 2, ..., P. This functionality provides the important feature of conducting online open-loop tests while the process is in closed-loop mode.

Using the scalar values of Eq. (1), the normalized response coefficients vector S can be expressed as $$S = \tilde{A}\tilde{U} \qquad (2)$$

where $\tilde{A}$ is termed the process model matrix containing the coefficients $b_{kn}$, constructed as $$\tilde{A} = \begin{bmatrix} b_{11} & b_{12} & \ldots & b_{1N} \\ b_{21} & b_{22} & \ldots & b_{2N} \\ \vdots & \vdots & \ddots & \vdots \end{bmatrix}_{P \times N} \qquad (3)$$

The vector $\tilde{U}$ represents the variable $\tilde{u}_i$ (i=1 ... m) and the corresponding fitted exponentials as $$\tilde{U}_m^T = [\tilde{u}_m^{h_1} \tilde{u}_m^{h_2} \ldots \tilde{u}_m^{kN}] \qquad (4)$$

The least square method is used to determine the model matrix $\tilde{A}$ as $$\tilde{A} = (\Phi^T \Phi)^{-1} \Phi^T Q \qquad (5)$$

The corresponding fitted exponentials of all m open-loop tests are arranged in matrix $\Phi$ as $$\Phi = \begin{bmatrix} \tilde{u}_1^{h_1} & \tilde{u}_1^{h_2} & \ldots & \tilde{u}_1^{h_N} \\ \tilde{u}_2^{h_1} & \tilde{u}_2^{h_2} & \ldots & \tilde{u}_2^{h_N} \\ \vdots & \vdots & \ddots & \vdots \\ \tilde{u}_m^{h_1} & \tilde{u}_m^{h_2} & \ldots & \tilde{u}_m^{h_N} \end{bmatrix}_{m \times N} \qquad (6)$$

The parameters $[\tilde{u}_1 \ldots \tilde{u}_m]$ in Eq. (6) represent the same manipulated variable at different magnitudes in each of the m open-loop tests. The normalized open-loop test coefficients are contained in matrix Q, where each column has the same prediction horizon expressed as $$Q = [Q_1 Q_2 \ldots Q_m]^T \qquad (7)$$

The key element of the IMPC methodology is that closed-loop control $u_c$, action is made equal to the open-loop test signal $\tilde{u}$ every $\Delta t$ to generate the vector S by inputting it into Eq. (1). This allows the determination of the plant model for the conventional controllers or the calculation of a new dynamic matrix for the predictive control schemes.

It is important to note that if the nonlinear plant model exists (e.g. nonlinear analytical expressions), which is not often the case, there is no need to determine the process model matrix $\tilde{A}$. As a result, the vector S can be obtained directly from injecting $\tilde{u}$ into the nonlinear plant model. This key feature of IMPC allows the conventional and predictive controllers to be reformulated every $\Delta t$.

IMPC methodology allows one to fictitiously conduct open-loop testing while the system is in closed-loop mode. This methodology, when implemented on systems with different degrees of nonlinearity on the process gain and time constant (e.g. single-input single-output (SISO) and multi-input multi-output (MIMO) nonlinear processes), gives improved results for various setpoint trajectories compared to linear and multi-model dynamic matrix controllers (DMC). This approach gives more accurate plant predictions resulting in improved control performance.

The IMPC methodology represents a continuous form of an advanced predictive controller in the limit ($\Delta t \to 0$). The strategy improves on existing linear and nonlinear predictive controllers by recalculating the system matrix, using continuous functions that are control move or manipulated variable dependent. The drawback of this approach is that this recalculation does not include the instantaneous value of the controlled variable or plant output. Therefore, its control performance on the challenging problem such as tracking of complex setpoint trajectories for highly nonlinear processes becomes non-optimal. The solution lies in the development of a broad spectrum nonlinear controller that handles nonlinearities that are dynamically progressing as the plant output moves from state to state.

The focus of this invention is to develop a simple and effective generic nonlinear control methodology that can provide good control performance for a wide range of common process nonlinearities.

SUMMARY OF THE INVENTION

This invention discloses a process for constructing a multi-dimensional nonlinear workspace to calculate a future open-loop dynamic response.

The method according to one embodiment of the invention involves the steps of:

(a) constructing an offline multi-dimensional nonlinear workspace matrix for applying open-loop test signals to a plant or nonlinear model using existing system identification/surface response techniques;

(b) calculating an initial normalized response matrix that captures the nonlinear plant state prior to control;

(c) calculating a first control action for implementation to a plant;

(d) during closed-loop control, conducting an online open-loop test at a current measured plant state for providing continuous open-loop dynamic information on the plant as it progresses through its nonlinear states;

(e) calculating an optimal constrained control move; and (f) calculating a future normalized response matrix.

A novel feature of this method is that at each sampling instant, an online moving open-loop test is conducted as the process travels through its closed-loop path. An accurate model of the nonlinear plant is extracted during closed-loop control, allowing reformulation of the controller every time step.

Another novel feature is that the methodology can be used with/superimposed on other advanced control strategies in order to improve their performance without changing the original structure of these advanced controllers. This is a powerful unique mechanism as it makes the procedure for enhancing/upgrading existing controllers to control nonlinear systems simple, in comparison to other approaches that are generally specific.

Methods according to the invention that have these novel attributes are termed Multi-Dimensional Nonlinear Control (MDNC).

The output from methods according to the invention can in one embodiment be implemented in a physical system by converting the control action value to an output control signal (an electrical signal for example) to effect a change in at least one operating variable (for example via a device, apparatus, controller or data acquisition system which controls the operating variable) of the physical system.

Methods according to embodiments of the invention are a nonlinear control strategy designed to handle single and multivariable plants with common nonlinearities such as varying process gain and time constants as well as deadtime and deadzone. These nonlinear parameters can be manipulated (control action) and controlled variable (process output) dependent. MDNC can be used to track complex setpoint profiles associated with the process to be controlled.

In accordance with another embodiment, the present invention relates to a computer implemented method of conducting closed-loop control of a physical system comprising the steps of: carrying out an initialization comprising the steps of (a) constructing a multi-dimensional nonlinear workspace; and (b) calculating an initial normalized response matrix that captures the nonlinear system state prior to conducting the closed-loop control, prior to commencing closed-loop control, of the physical prior to commencing closed-loop control, evaluating the optimal constrained control move using the system error and the initial normalized matrix using a control move solver; calculating a first control action by the sum of delta u(0) and the initial control action; and implementing the result to the physical system by converting the control action to an output control signal to effect a change in at least one operating variable.

The application of MDNC is potentially very wide to physical systems which have operating variables which are to be controlled. Physical systems can include industrial processes and equipment comprised of one or more processes. For example, MDNC has been successfully applied to plastic injection molding. Operating variables which can be controlled in an injection molding process include injection speed, temperature, pressure, and pH.

In an embodiment of the control method of the invention, the output of the control method is one or more control action value that can be converted to a corresponding electrical signal by a data acquisition system which can be used to control or alter an operating variable in the physical system being controlled.

Other areas of application of MDNC include manufacturing processes, robotics, aerospace and other nonlinear processes.

MDNC can be implemented as a computer implemented method on suitable computer hardware including a CPU.

In another embodiment, the invention relates to a computer readable memory having recorded thereon statements and instructions for execution by a computer to carry out the methods described herein.

In another embodiment, the invention relates to use of a multi-dimensional nonlinear workspace to calculate a future open-loop dynamic response.

In a further embodiment, the invention relates to a method of constructing a multi-dimensional nonlinear workspace to calculate a future open-loop dynamic response.

DETAILED DESCRIPTION OF THE INVENTION

MDNC is specifically designed for controlling nonlinear processes with the nonlinearities as described above. It is assumed that the plant/process has initial states of a control action/signal of $u_{in}$, and an output $y_p$. The values of $y_p$ and $u_{in}$, may be zero or have constant values (or any value) depending on the initial state of the plant prior to control. The nonlinear plant has a setpoint profile or desired target of $Y_{sp}$ that is specified.

Figure 1:
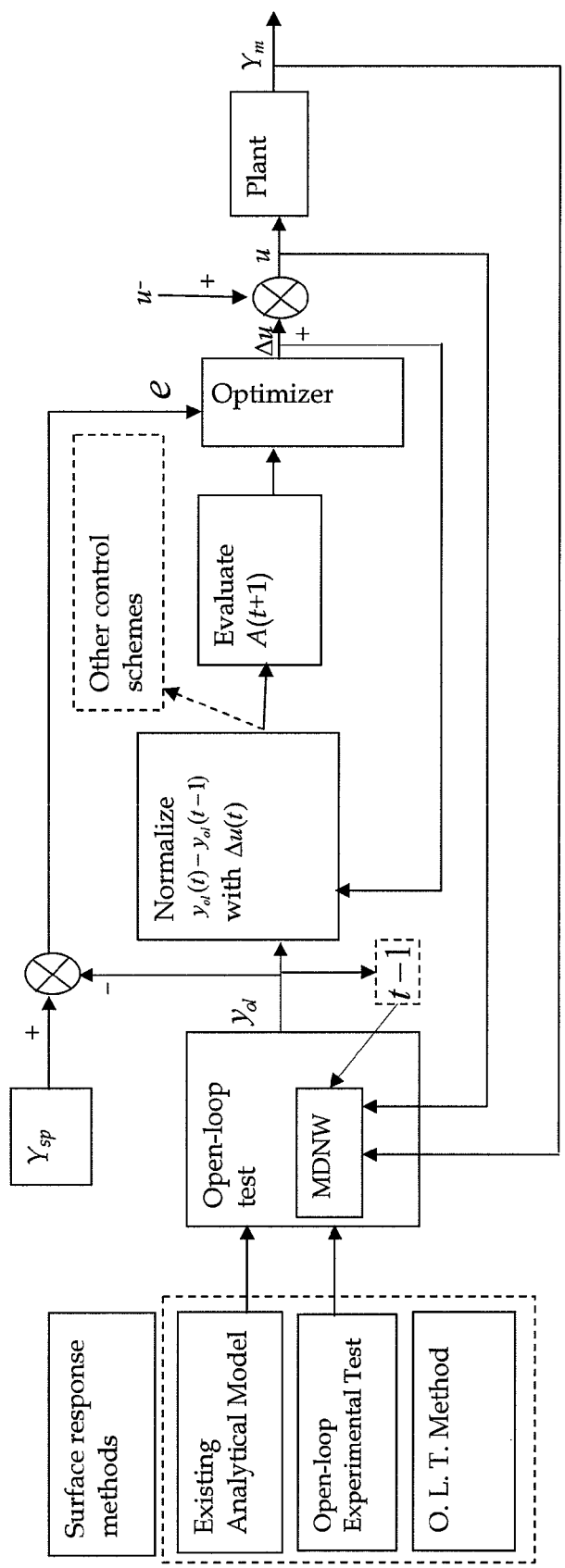
FIG. 1 is a schematic block diagram of a MDNC structure in accordance with an embodiment of the invention.

The following steps are one embodiment of the present invention. The steps itemize the details associated with MDNC using the structure as shown in FIG. 1. Steps 1-5 are categorized as a unique initialization procedure designed for nonlinear plants that are conducted at time t prior to commencing closed-loop control of the plant.

Step 1. A multi-dimensional nonlinear workspace (MDNW) is formulated using existing surface response methodologies which are based on statistical analyses and system identification techniques [1, 2]. Analytical expressions or experimental data (in the absence of analytical expressions) can be used in the formulation of the MDNW. A workspace matrix is obtained which contains the various model responses for corresponding model states. This nonlinear workspace is formulated offline.

Step 2. Prior to control, an open-loop test signal $u_{ol}(t^-)$ is selected using the MDNW in order to provide an initial normalized open-loop trajectory $y_{ol}(t^-)$ in the vicinity of the process initial state.

Step 3. The $y_{ol}(t^-)$ trajectory is subtracted from the plant setpoint profile $Y_{sp}$ to evaluate a vector of future errors $e(t^-)$.

Step 4. Using the initial open-loop trajectory $y_{ol}(t^-)$, the difference $y_{ol}(t^-)-y_p$ is determined. This difference is divided by the change in the control signal $u_{ol}(t^-)-u_{in}$ to formulate an initial normalized response matrix $A_{in}$.

The following steps (a) and (b) are executed only once after step (4) which represents the start of closed-loop control at t=0:

(a) Evaluate the optimal constrained control move $\Delta u(t)$ using the plant errors $e(t^-)$ and $A_{in}$ using an optimizer or control move solver.

(b) Calculate the first control action u(0) as $\Delta u(0)+u_{in}$, and implement to the plant.

Step 5. The closed-loop control algorithm continues in a loop from step (5). The control action as time advances to the next time step (and becomes the current time t) is now defined as u(t).

Step 6. At the sampling interval $\Delta t$, the process/plant output is measured as $Y_m(t)$.

Step 7. The current control action u(t) and the measured plant output $Y_m(t)$, both at instant t and the MDNW are used to evaluate an open-loop trajectory $y_{ol}(t)$. This signifies that an open-loop test is conducted online at the current measured plant state $Y_m(t)$. As a result, an open-loop dynamic behavior of the plant is obtained at its current state $Y_m(t)$.

Step 8. Using $Y_m(t)$ and the first element of the previous open-loop trajectory $y_{ol}(t-1)$, the difference $Y_m(t)-y_{ol}(t-1)$ is added to $y_{ol}(t)$ to correct for modelling errors.

Step 9. The $y_{ol}(t)$ trajectory is subtracted from the plant setpoint profile $Y_{sp}$ to generate a vector of future errors e(t).

Step 10. The optimal constrained control move $\Delta u(t)$ is evaluated using e and A(t) in an optimizer, or in any other advanced control move solvers/schemes.

Step 11. Using the previous open-loop trajectory $y_{ol}(t-1)$, the difference $y_{ol}(t)-y_{ol}(t-1)$ is determined.

Step 12. The difference $\|y_{ol}(t)-y_{ol}(t-1)\|$ should be larger than a set tolerance $\epsilon$ in order for the normalized response matrix A(t+1) at the next time step to be re-evaluated.

Step 13. If the condition in step (12) is true ($\|y_{ol}(t)-y_{ol}(t-1)\|$ larger than $\epsilon$), the difference $y_{ol}(t)-y_{ol}(t-1)$ is then divided by the current control change $\Delta u(t)$ in order to formulate $A(t+1)$.

Step 14. The parameters $y_{ol}(t-1)$ and $u^-$ are updated to $y_{ol}(t)$ and $u(t)$.

Step 15. The control loop repeats at step (6).

Examples of the application of MDNC are provided below.

Example 1

Hoop and Bead System Simulation

Figure 2:
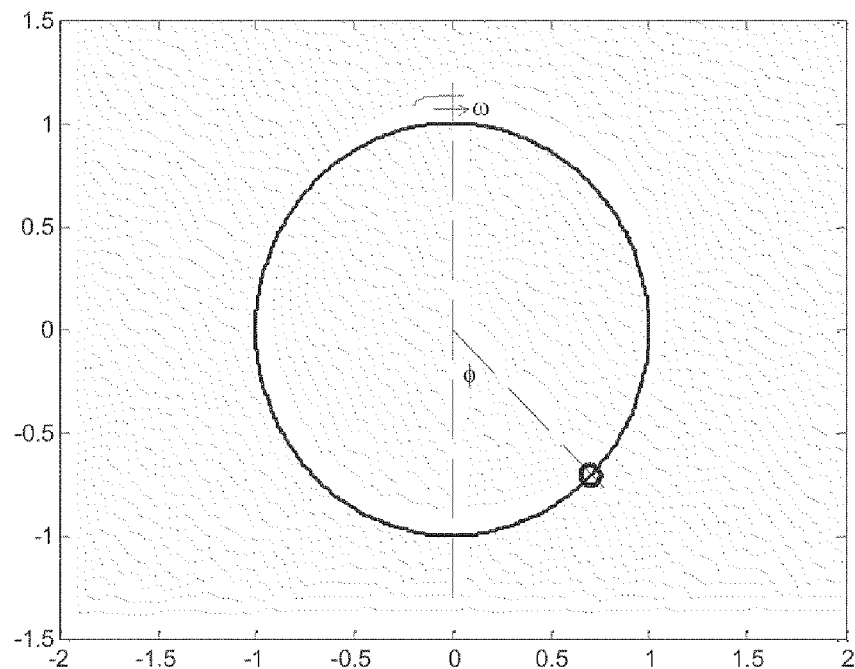
FIG. 2 is graph of a hoop and bead system whose control was simulated in accordance with an embodiment of the invention.

A simulation using MDNC to control a simulated hoop and bead system was carried out. The system consisted of hoop to which an angular velocity is induced along a transversal axis as shown in FIG. 2. A bead was attached to this hoop and was constrained to move along its circumference. The system can be imagined to be immersed in a viscous fluid and so viscous friction impedes the movement of the bead. As the hoop angular velocity increases, centrifugal forces increase the angle φ of the bead with respect to vertical. Depending on the values of the coefficients involved, the hoop-and-bead system can exhibit considerable nonlinear behavior.

The mathematical model for the hoop and bead system in state-space form is shown as $$\dot{x}_1 = x_2 \qquad (8)$$
$$\dot{x}_2 = -\frac{b}{mr}x_2 - \frac{g}{r}\sin(x_1) + \sin(x_1)\cos(x_2)\omega^2$$

where b is the viscous damping, g is the acceleration due to gravity, m is the mass of the bead, r is the radius of the hoop, and ω is the angular velocity of the hoop. The x-terms are the states of the system.

Figure 3:
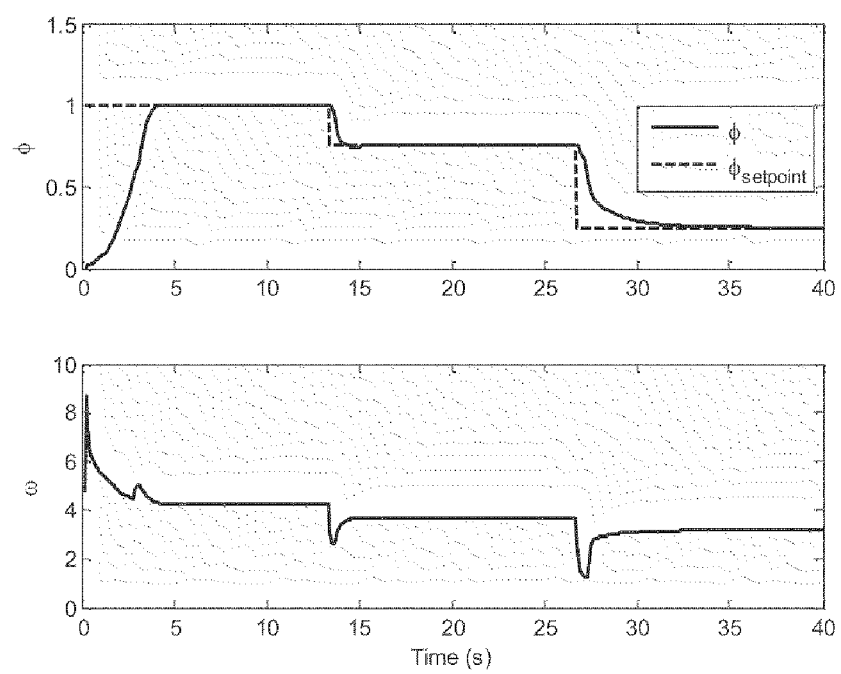
FIG. 3 are graphs of results of the hoop and bead system simulation in accordance with an embodiment of the invention.

A nonlinear multi-dimensional workspace was developed for this system and MDNC was applied in simulation. Good control responses were obtained for different setpoint levels as shown in FIG. 3.

Example 2

Injection Molding Process

Figure 4:
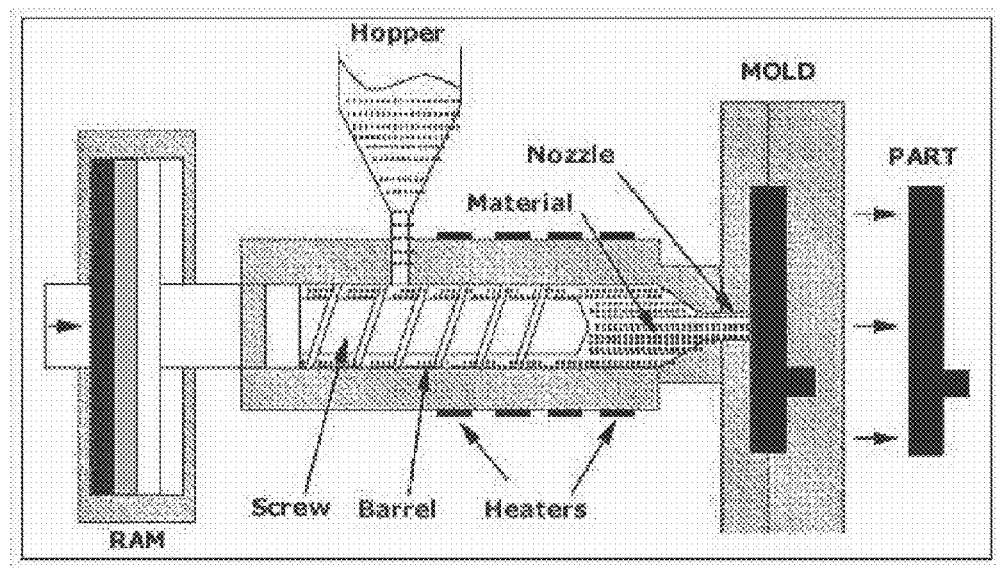
FIG. 4 is a schematic diagram of an injection molding process to which an embodiment of the invention was applied.

Injection molding is an advanced state-of-the-art manufacturing process that comprises of a rich set of challenging nonlinear multivariable processes to be controlled, some of which have time varying characteristics. MDNC was applied to the difficult to control injection molding process shown in FIG. 4 during the filling cycle of the injection molding machine ("IMM").

Figure 5:
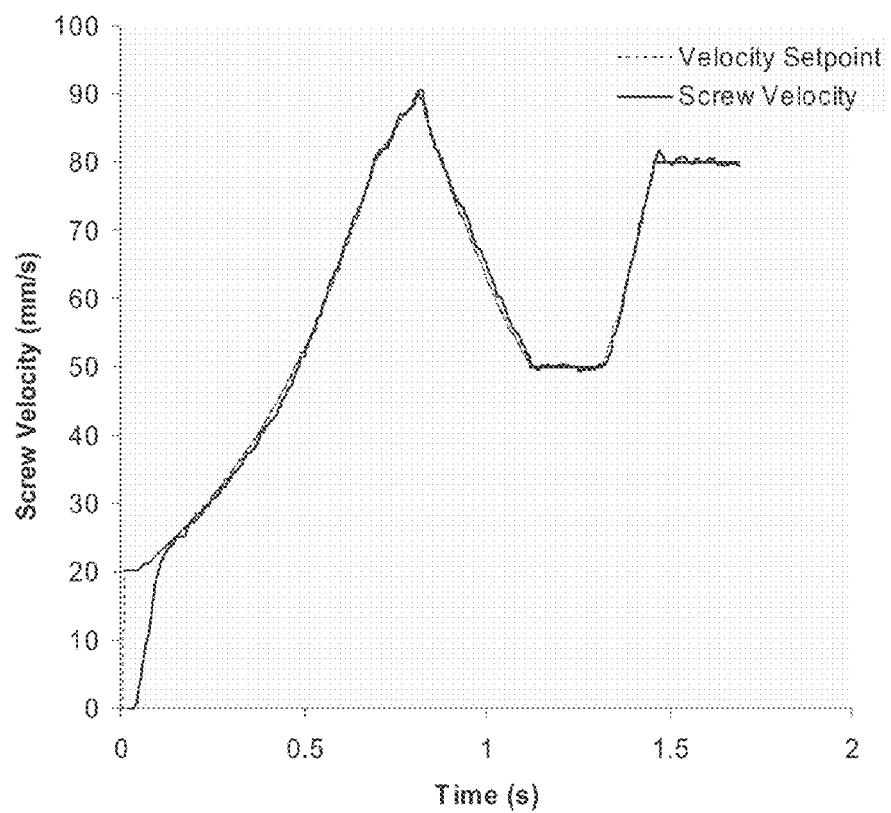
FIG. 5 is a graph showing setpoint tracking of the injection molding process of FIG. 4 using an embodiment of the invention.

Briefly, the process of injection speed involves forcing molten polymer through a very narrow gate into a steel mold where the viscosity of the flow length in the mold and gate change rapidly spatially demonstrating the nonlinearity of the process. Formulation of a multi-dimensional nonlinear workspace (MDNW) using statistical analyses and system identification techniques was conducted for the injection speed process. The controller was placed under an arduous practical testing procedure on the IMM of tracking nonlinear (parabolic) speed profiles as shown in FIG. 5. MDNC tracked the various nonlinear speed profiles very well, able to follow severe changes in setpoint as in FIG. 5. In other tests, the controller was able to reach a speed of 100 mm/s in less than 0.25 s (faster than the internal controller) with the ability to track various ramp profiles.

The following references are incorporated herein by reference in their entirety.
1. Process Dynamics and Control, B. Roffel and B. Betlem, Wiley, 2006.
2. Response Surface Methodology, R. Myers and D. Montgomery, Wiley, 2002.
3. Deshpande, P. B. and Raymond H. A., Computer Process Control with Advanced Control Applications. $2^{nd}$ Edition, ISA 1988.
4. Dahlin, E. B., Designing and tuning digital controllers. Instruments and Control Systems, 41, 77-83, 1968.
5. Dumont, G. A., Analysis of the design and sensitivity of the Dahlin regulator. Internal report, Pulp and Paper Research Institute of Canada, 1982.
6. Cutler, C. R., and Ramaker, D. L., Dynamic matrix control—a computer control algorithm. Proc. JACC; San Francisco, Calif., 1980.
7. Shridhar, R., and Cooper, D. J., A tuning strategy for unconstrained SISO model predictive control. Industrial & Engineering Chemistry Research. 36, 729-746, 1997.
8. Gupta, Y. P., "Characteristic Equations and Robust Stability of a Simplified Predictive Control Algorithm", Canadian Journal of Chemical Engineering, 71, 1993, 617.
9. Abu-Ayyad, M., Dubay, R., and Kember, G. C., SISO Extended predictive control—formulation and the basic algorithm. ISA Transactions, 45, 9, 2006.

We claim:

1. A computer implemented method of conducting closed-loop control of a physical system comprising the steps of:
    calculating an initial normalized matrix that captures the nonlinear state of the system prior to conducting the closed-loop control;
    measuring the system output as a function of the next time step at a sampling interval;
    evaluating an open-loop trajectory at an instant using both a current control action and the measured system output, at the instant;
    correcting the open-loop trajectory at an instant by adding the difference of the previous open-loop trajectory subtracted from the system output;
    providing a system setpoint profile;
    subtracting the open-loop trajectory at the instant from the system setpoint profile to yield a vector of future errors at the instant;
    providing a previous error trajectory;
    subtracting the previous error trajectory from the error trajectory at the instant to yield an error trajectory difference;
    evaluating the optimal constrained control move using an advanced control move solver; and
    if the open-loop trajectory difference is greater than a set tolerance, normalizing the matrix at the next step to be evaluated.

2. The method according to claim 1 further including the step of continuing the closed loop control to a next time step.

3. The method according to claim 1 wherein the matrix is evaluated by dividing the open-loop trajectory difference by the current control change.

4. The method according to claim 1 further including the step of updating the previous open-loop trajectory and the control action signal to the instant.

5. A computer readable memory having recorded thereon statements and instructions for execution by a computer to carry out the method of claim 1.

6. The method according to claim 1 further comprising the step of constructing a multi-dimensional nonlinear workspace.

7. The method according to claim 6 wherein the workspace is a matrix for applying open-loop test signals to the system.

8. The method according to claim 6 wherein the workspace is formulated using conventional surface response methodologies.

9. The method according to claim 8 wherein the matrix is constructed using an open-loop test signal selected using the nonlinear workspace wherein an initial normalized open-loop trajectory in the vicinity of the system initial state is provided.

10. The method according to claim 1 wherein the system is selected from the group consisting of a plant and an industrial process.

* * * * *